Jan. 19, 1960 W. H. SWAIN 2,922,115

SIGNAL TRANSLATING AMPLIFYING SYSTEM

Filed Aug. 16, 1954 2 Sheets-Sheet 1

INVENTOR.
WILLIAM H. SWAIN

BY William R. Sherman

HIS ATTORNEY

INVENTOR.
WILLIAM H. SWAIN
BY William R. Sherman
HIS ATTORNEY

United States Patent Office 2,922,115

Patented Jan. 19, 1960

2,922,115

SIGNAL TRANSLATING AMPLIFYING SYSTEM

William H. Swain, Mount Pleasant, N.Y., assignor, by mesne assignments, to Schlumberger Well Surveying Corporation, Houston, Tex., a corporation of Texas Application August 16, 1954, Serial No. 450,009

14 Claims. (Cl. 330—70)

This invention relates to signal translating systems and, more particularly, to wideband direct coupled series amplifiers capable of translating signals over a wide range of frequencies including the audio and video spectrum and extending to D.-C.

Direct coupled amplifiers have heretofore been described in which the anode-cathode circuits of a pair of triode-type electron discharge devices are serially connected with a load impedance between the terminals of an anode current supply. In high frequency applications where such load impedance may comprise a tuned or inductive circuit affording a high signal impedance but low D.-C. resistance, a sufficient D.-C. anode current may be obtained from the anode supply for operating these triodes with a high gain. Where signals of frequencies extending as low as zero are to be amplified, however, a load resistor is customarily employed. Since the resistance value of this load resistor cannot at once be high as to the output signal and low as to the series anode current, the triodes will be operated with low anode currents and consequently with low amplification factors.

Hence, high gain, direct coupled series amplifiers have not heretofore been achieved where a load resistor is employed. Moreover, attempts to increase the gain of such amplifiers have generally resulted in unstable signal amplification.

Accordingly, it is an object of this invention to provide new and improved apparatus for overcoming these disadvantages of prior art direct coupled amplifiers for wideband operation.

It is another object of this invention to provide a new and improved direct coupled series amplifier which permits the attainment of substantially optimum values of high gain, linearity, low-noise level and stability for audio and video frequency and D.-C. signals.

Another object of this invention is to provide such an amplifier having an effective feedback arrangement for enhanced stability and other desired characteristics.

These and other objects of the invention are attained, briefly, by direct coupling of a grid-driven input triode and a cathode-driven second triode in series between terminals of a D.-C. power supply with D.-C. current separately introduced into the anode-cathode circuit of the input triode. This separate current introduction is accomplished through an impedance having a sufficiently low resistance to the flow of D.-C. current to cause efficient operation of the input triode and having a sufficiently high resistance to the signal from the input triode to prevent appreciable diversion of signal strength from the second stage of the amplifier.

More particularly, in one embodiment of the invention the control grid or electrode of the second triode is held substantially at ground potential by a connection through a by-pass condenser. A second embodiment of the invention especially adapted for D.-C. operation provides a connection of this control electrode to a voltage supply regulated by amplifier feedback.

In modifications of the invention provision is made for decoupling a common anode current supply for subsequent stages of amplification, as well as for providing a relatively high impedance feedback circuit of novel character.

The novel features of the present invention are set forth with particularity in the appended claims. The present invention, both as to its organization and manner of operation, together with further objects and advantages thereof, may best be understood by reference to the following detailed description taken in conjunction with the accompanying drawings, in which:

Figure 1:
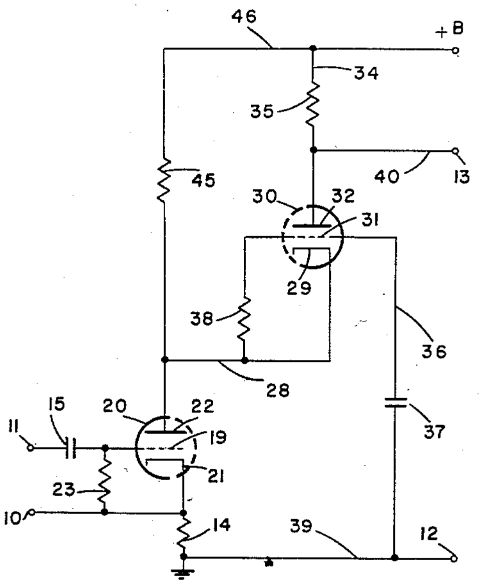
Fig. 1 is a schematic circuit diagram of a wideband signal translating device embodying the invention.

Referring now to the drawings, wherein like reference characters denote similar circuit elements, Fig. 1 shows a low frequency signal translating system, which embodies the present invention, extending between input terminals 10 and 11 and output terminals 12 and 13. Input terminal 10 may be connected by a cathode resistor 14 of relatively low value to ground at a reference potential, while input terminal 11 may be connected by a coupling capacitor 15 to control electrode or grid 19 of an electron discharge device 20 of the triode type. In addition to the control electrode 19, the triode 20 includes a cathode 21 and a plate or anode 22 together defining an anode-cathode circuit. A grid resistor 23 is shunted between control electrode 19 and cathode 21, while cathode 21 is substantially grounded by resistor 14. Thus, the triode 20 may be characterized as a grid-driven, grounded-cathode input tube.

To provide a direct interstage coupling, anode 22 of the input triode 20 is directly connected by a lead 28 to cathode 29 of a second electron discharge device 30. This second electron discharge device 30 is preferably a triode and includes a control grid 31 and a plate or anode 32 so as to have an anode-cathode circuit in series connection with the anode-cathode circuit of input triode 20. The anode 32 of the second triode 30 is connected by lead 34 through a load impedance 35 to a positive terminal B+ of a suitable anode current supply (not shown). Hence a path for anode current from the B+ terminal is provided by the series connection, in order, of the load impedance 35, the anode-cathode circuit of the second triode 30, and the anode-cathode circuit of the input triode 20, with the anode current returning to ground via resistor 14. The triodes 20 and 30 may conveniently be enclosed within a single envelope.

To fix the potential of control electrode 31 so that the second triode 30 may be effectively driven by variations in potential of its cathode 29, control electrode 31 of the second triode is connected to ground by lead 36. However, as it is desirable to establish a slight negative bias on the control electrode 31 with respect to cathode 29, a by-pass capacitor 37 is interposed in lead 36 between the control electrode and ground having a sufficiently high capacitance to fix the control electrode at ground potential with respect to low frequency signals and yet to permit maintenance of a D.-C. bias on the control electrode. This slight negative bias may be established conveniently by a connection of grid resistor 38 between control electrode 31 and cathode 29 of the second triode 30. Such resistor 38 has a very high value and serves in a well-known manner to develop the desired self-bias potential. Accordingly, the second triode 30 may be characterized as a cathode-driven, grounded-grid output or second stage tube operating with a negative grid bias.

As thus far described, a transmission network is provided for low frequency signals which may be directly coupled to the output terminals 12 and 13 by lead 39 grounding terminal 12 and lead 40 connecting terminal 13 to anode 32 of the output triode 30. To obtain a high voltage gain with this network, preferably extending above, through and below the audio frequency spectrum, the load impedance 35 is selected as a high valued resistor. In consequence, however, the current passing through the input triode 20 would be so small with reasonable values of potential on the anode current supply that high values of amplification factor could not be realized. In accordance with the present invention, this difficulty is overcome by connecting anode 22 of the input triode 20 through a current supply impedance 45 to the positive terminal of a suitable anode current supply. To this end, lead 46 connects impedance 45 directly to the anode 22 and to the B+ terminal, thus connecting it in parallel across the load resistor 35 and the anode-cathode circuit of the second triode 30. The value of the impedance 45 is desirably low as to D.-C. current and high as to A.-C. current in order that input triode 20 may be supplied with substantial D.-C. anode current with a moderate supply potential on the B+ terminal, and yet the strength of the signal will not be dissipated between stages of amplification in the impedance 45. In a practical system for amplifying audio frequency signals extending down to very low frequencies, the current supply impedance 45 may preferably comprise a resistor having a single impedance value over the range of frequencies transmitted with the value selected for optimum gain characteristics of the amplifier and generally being less than the resistance of load resistor 35.

A further understanding of the relationship of the various circuit values may be gained from the following enumeration given by way of example and not in limitation of the invention:

| | |
|---|---|
| Triodes 20 and 30 | Type 6112 |
| Resistance of resistor 45 ............ kilohms | 47 |
| Resistance of resistor 35 ............ megohms | 1.1 |
| Resistance of resistor 38 ............ do | 10 |
| Capacitance of capacitor 37 ............ mfd | 0.01 |
| Anode supply potential ............ volts | 150 |

In lieu of the type 6112 subminiature duo-triode, such triodes as the type 12AX7 and 12AT7, or other reliable tubes with low gas content may advantageously be employed. It may be observed that the value of the load resistor 35 is about an order of magnitude larger than the current supply resistor 45.

In operation, a low frequency signal is connected at input terminals 10 and 11 to the grid-cathode circuit of input triode 20, so that an amplified signal of opposite phase is developed between anode 22 and ground. Direct application of this amplified signal via lead 28 to cathode 29 of the second triode 30 drives the cathode with respect to the relatively fixed A.-C. ground potential of control electrode 31 so as to generate a yet further amplified alternating potential signal across load impedance 35 between the anode 32 and ground. This signal, which is in phase with the amplified signal on anode 22, is then applied to output terminals 12 and 13 via leads 39 and 40.

Considering more particularly the flow of D.-C. current, the injection of anode current into the triode 20 via the resistor 45 brings the triode to a condition of high amplification factor (mu) and small anode resistance ($r_p$). In general, an analysis of the circuit will demonstrate that the overall gain is proportional to the product of the amplification factors of triodes 20 and 30 and increases with decreasing values of anode resistance. Hence, the modification in the anode current through triode 20 effected by current supply resistor 45 serves to provide almost the optimum voltage gain obtainable with a pair of triodes.

As another significant characteristic of the circuit herein described, experience has shown that a grounded-cathode triode stage followed by a grounded-grid triode stage affords extremely low noise figures in comparison with other amplifying systems employing triode tubes. The triode operation of the tubes with direct coupling and with resistive load and current conducting impedances results, moreover, in a high degree of linearity and broad bandwidth in the low frequency range extending from a fraction of a cycle to somewhat over 100 kilocycles.

Figure 2:
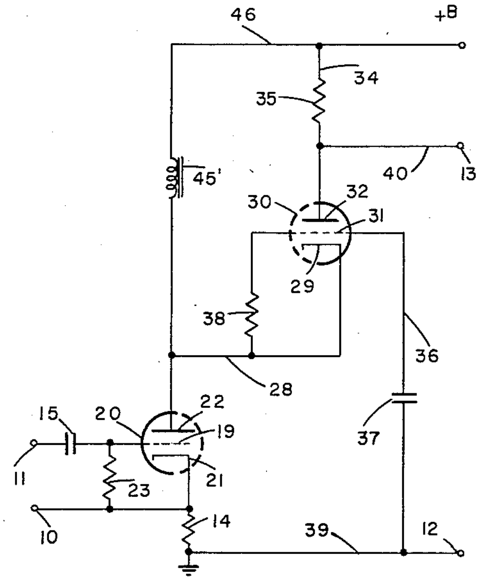
Fig. 2 is a schematic circuit diagram of a modified form of the invention.

In the modification of the invention illustrated in Fig. 2, a current conducting impedance 45' in the form of a choke coil is employed in lieu of the resistive current conducting impedance 45. The inductance value of the choke coil 45' is preferably high and is, indeed, limited only by practical considerations of space and the like.

The circuit of Fig. 2 is otherwise substantially the same as the circuit of Fig. 1 and will have substantially the same operation, but with improved gain characteristics at the upper frequencies of the audio spectrum and thereabove. It will be apparent, of course, that various combinations of resistors and inductances may be suitably combined in lieu of inductance 45' to comprise the D.-C. current path, so long as the D.-C. resistance remains sufficiently low and the resistance to the signal remains sufficiently high for the desired voltage gain.

Figure 3:
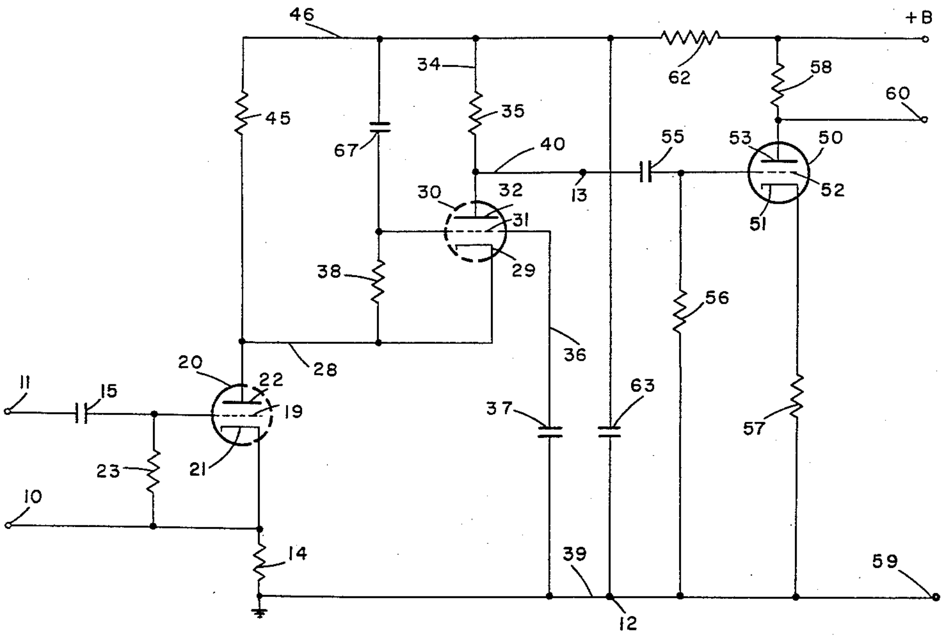
Fig. 3 is a schematic circuit diagram of another modification of the invention including an arrangement for decoupling a common anode current supply.

In the embodiment of the invention depicted in Fig. 3, a modification of the invention is made to compensate for the effect of a common anode current supply arising from additional stages of amplification. To exemplify the source of this effect, a third electron discharge device 50 having a cathode 51, control electrode 52 and anode 53 is connected as a conventional triode amplifier stage. Thus, control electrode 52 is coupled to the terminal 13 by capacitor 55 and has a grid resistor 56 connected in the grid-cathode circuit which may include a cathode resistor 57. Load resistor 58 is connected between the anode 53 and the positive terminal B+ of a convenient anode current supply. The output for this third stage is then obtained between grounded terminal 59 and terminal 60 connected to the anode 53.

It will be clear that the amplified signal appearing at terminal 60 is reversed in phase with respect to the signals on anodes 32 and 22. Since any practical source of anode current will have internal resistance, changes in anode current through the triode 50 will produce corresponding potential differences across this internal resistance, thereby modifying the actual supply potential applied through resistors 35 and 45 to the anodes 32 and 22, respectively. The coupling produced through the internal resistance of the common anode supply constitutes inverse feedback and would tend to diminish the high voltage gains obtainable with the novel double triode input circuit, especially by coupling through resistor 45 to cathode 29.

This undesirable feedback is diminished in part by a decoupling resistor 62 connected between the B+ terminal and the leads 34 and 46 together with a capacitor 63 connecting between leads 34, 46 and ground at terminal 12.

The residual undesired feedback together with noise from the current source are, in accordance with the invention, substantially eliminated by a bridge circuit arrangement including current supply resistor 45 and cathode 29. As the object of this bridge circuit arrangement is to balance the potential difference between the control electrode 31 and the cathode 29 against any variations in supply potential, the capacitance of capacitor 67 should be proportioned to the capacitance of capacitor 37 in the ratio of the effective impedances between the B+ terminal and cathode 29, and between cathode 29 and ground, respectively. With the circuit values given above, the capacitor 67 may have a value of 0.01 mfd. to nullify the coupling effects and noise in a satisfactory manner.

Thus, variations in the potential of the anode current supply will not drive the cathode 29 of the second triode relative to its control electrode 31. In other respects, the circuit of Fig. 3 is substantially identical to the circuit of Fig. 1 in relationships and operation. While the principle has been demonstrated with a single additional stage, it is noted that this same bridge decoupling arrangement is fully effective with multistage devices of a more complex nature which may introduce positive feedback and extraneous noise disturbances through the B+ supply impedance.

Figure 4:
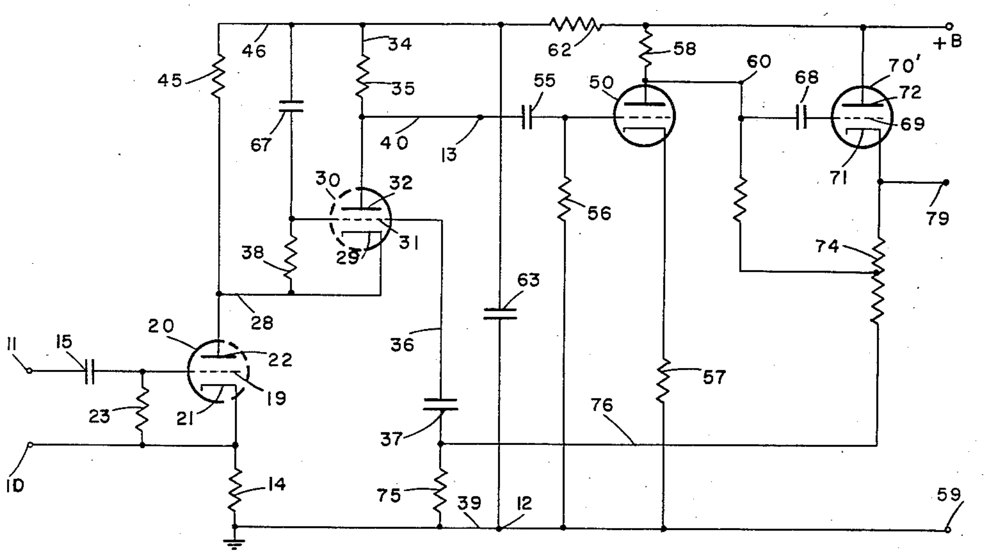
Fig. 4 is a schematic circuit diagram of yet another modification of the invention embodying a feedback arrangement.

A novel high impedance feedback circuit is embodied in the modification of the invention illustrated in Fig. 4. While a suitable feedback signal may be obtained in a variety of ways, it is advantageously obtained from the cathode circuit of a cathode follower output stage. To this end, the circuit of Fig. 3 is augmented as shown in Fig. 4 by capacitor 68 coupling control electrode 69 of a fourth electron discharge device 70 to the terminal 60. This device 70 may again be a triode comprising a cathode 71 and anode 72 as well as the control electrode 69. Anode 72 is connected directly to the positive terminal B+ of the anode current supply, while cathode resistances 74 and 75 connected in series by the lead 76 between cathode 71 and ground form a potential divider. Cathode resistor 75 is interposed in lead 36 between capacitor 37 and ground so as to be serially connected in the circuit which effectively grounds control electrode 31 for low frequency signals. Hence, the resistance value of resistor 75 may appropriately be selected an order of magnitude or more lower than the resistance value of grid resistor 38 so as not to obstruct the effectual A.-C. grounding of the control electrode 31. The output signal for this four-stage amplifier is now obtained between grounded terminal 59 and terminal 79 connected to cathode 71.

In operation, a potential proportional to the output signal across terminals 59, 79 appears across resistor 75 in consequence of its serial connection with resistor 74 as a voltage divider. As capacitor 37 offers negligible impedance to a low frequency signal, this feedback potential is applied to the control electrode 31 of the second triode 30. With one conventional amplification stage 50 intervening between triode 30 and cathode follower 70, the feedback signal obtained with this arrangement will be regenerative. It will be apparent, of course, that an additional intervening stage of amplification or more would result in inverse feedback, if such is preferred.

Particularly noteworthy in this feedback circuit is the magnitude of the resistor 75 which may be suitably employed. Thus, where the resistance of resistor 38 is 10 megohms in the example above given, the value of resistor 75 may be on the order of several hundred kilohms. For this reason, very large feedback signals may be obtained without imposing an undue load upon the cathode follower 70. At the same time, this feedback circuit requires only an additional resistor 75 since the by-pass capacitor 37 is already available to couple the feedback signal to the control electrode 31.

One mode of utilizing the principles of the invention of Figs. 1–4 is shown and described in copending application Serial No. 403,285, filed January 11, 1954, for "Signal Amplifying System" by Raymond A. Runyan and assigned to the assignee hereof. In such arrangement, the amplifying system of this invention affords a voltage gain of 1000 with frequency response from D.-C. to 10 kilocycles of plus or minus 2%, linearity better than plus or minus 0.5% and D.-C. accuracy of plus or minus 1% of full scale reading. These desirable characteristics are coupled with a very low noise figure and, by employing inverse feedback, include extreme stability despite variations in supply potential or tube characteristics.

An application of the principles of this invention for

Figure 5:
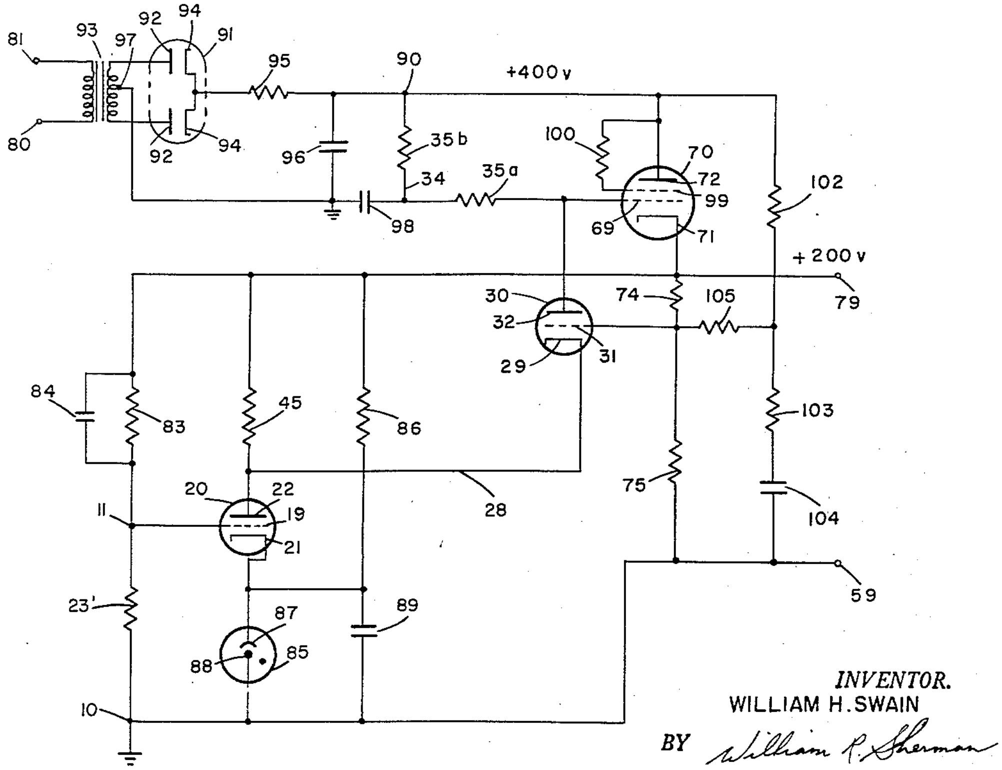
Fig. 5 is a schematic circuit diagram of another embodiment of the invention especially adapted for D.-C. amplification.

D.-C. operation is shown in Fig. 5 having the purpose of voltage regulation. While supply terminals 80, 81 may, by connection to a suitable A.-C. supply (not shown), be considered the input terminals for voltage regulation, a better understanding of this invention in relation to the preceding embodiment and its modifications will follow by considering terminals 10, 11 in Fig. 5 to carry the input signal. Such input signal actually represents feedback from the signal at output terminals 59, 79.

The input signal is derived from resistor 23' connected in series through terminal 10 to ground and through terminal 11 to resistor 83 shunted by capacitor 84, thence to output terminal 79. The resistors 23' and 83 thus constitute a voltage divider across output terminals 59, 79 and also, by connection of resistor 83 to cathode 71 of an electron discharge device 70', constitute a portion of the cathode circuit of this device 70'.

To couple this input signal to the triode 20, terminal 11 is connected directly to control electrode 19, while terminal 10 may be connected with cathode 21 through a voltage regulating gaseous discharge device 85 serving to supply a stable voltage reference and also to bias the control electrode negatively with respect to the cathode. By connection of a resistor 86 between cathodes 71 and 21, direct current may be passed through the device 85 between its anode 87 and cathode 88 to maintain it in an active ignited condition. A capacitor 89 connected across device 85 serves to by-pass noise signals to ground.

As in Fig. 4, for example, the anode 22 (Fig. 5) of first triode 20 is connected directly to the cathode 29 of second triode 30. The anode 32 of triode 30, in turn, is connected through a load resistance 35*a*, 35*b* to a positive terminal 90. Here, however, a positive potential is developed at terminal 90 by full-wave rectification of unregulated A.-C. potential by a duo-diode type electron discharge device 91 having its anodes 92 coupled by a transformer 93 to terminals 80, 81 and its cathodes 94 connected by cathode resistor 95 to terminal 90. The unregulated potential at terminal 90 is subjected to the filtering action of capacitor 96 connected between cathodes 94 and ground, a midtap 97 of the secondary winding of transformer 93 also being grounded. A capacitor 98 also connects the junction of load resistors 35*a* and 35*b* to ground.

The electron discharge device 70' will now be observed to have its cathode 71 directly connected to each of resistors 45, 74, 83 and 86 arranged in parallel, as well as to positive terminal 79. Anode 72, on the other hand, is directly connected to the positive terminal 90 which normally will be at a higher potential than terminal 79 to cause anode current flow from anode 72 to cathode 71. The device 70' may be a screen grid tube having a screen electrode 99 connected by a screen grid resistor 100 to the anode 72 so as to operate substantially as a triode. Alternatively, of course, the device 70' may be a triode, essentially being characterized as a series valve. Control of the anode current through this valve 70' is effected by control electrode 69 directly connected to the junction of load resistor 35*a* and anode 32.

As undesirable D.-C. variations or ripple frequency signals at terminal 90 may be transmitted by the dynamic plate resistance of valve 70' to terminal 79, or by resistors 35*a*, 35*b* and the trans-conductance of valve 70' also to terminal 79, a further compensating feedback network is provided which includes resistors 102, 103 and a capacitor 104 serially connected in that order between positive terminal 90 and ground. A coupling resistor 105 is directly connected to the control electrode 31 of second triode 30 and to the junction of resistors 102 and 103. The values of resistor 103 and capacitor 104 are selected for amplitude and phase adjustment of the ripple feedback to balance amplitude and phase shift in the ripple component undesirably coupled by valve 70′ to terminal 79 as a result of its dynamic plate resistance and the lack of infinite gain in tubes 20 and 30.

Exemplary values for the elements in the system of Fig. 5 are as follows:

| | |
|---|---|
| Voltage reference tube 85 | Type 5651. |
| Resistance of resistor 23′ | 820 kilohms. |
| Resistance of resistors 35*a*, 35*b* | 220 kilohms each. |
| Resistance of resistor 74 | 56 kilohms. |
| Resistance of resistor 75 | 150 kilohms. |
| Resistance of resistor 83 | 1 megohm. |
| Resistance of resistor 95 | 100 ohms. |
| Resistance of resistors 102, 105 | 270 kilohms each. |
| Resistance of resistor 103 | 22 kilohms. |
| Capacitance of capacitors 84, 98 | 0.1 mfd. each. |
| Capacitance of capacitor 104 | 0.068 mfd. |

In operation, an alternating potential applied to terminals 80, 81 is rectified by duo-diode 91 and filtered by capacitors 96, 98 and resistor 35*b*. An unregulated positive potential of 400 volts, for example, is thereby obtained at terminal 90 which generally will contain a ripple frequency component. To translate this high potential to a lower constant D.-C. potential, such as 200 volts, free of A.-C. components, the high potential is applied to the anode circuit of the series valve 70′ and the valve is grid-driven by a degenerative feedback signal productive of the desired potential on output terminals 79, 59 of the cathode circuit.

The signal for driving the series valve 70′ is developed by feedback from output terminals 79, 59 across resistor 23′ of potential divider 83, 23′, and is amplified in the direct coupled triodes 20, 30 and applied across the load resistors 35*a*, 35*b* to the control grid 69. Capacitor 84 serves then to emphasize the ripple frequency and noise component of this feedback, thereby to increase the ripple frequency rejection in the series valve.

The operation of the triodes 20 and 30 is similar to that of the preceding embodiment. Thus, the input triode is grid-driven with the potential of its cathode 21 substantially fixed by the voltage reference tube 85 with respect to ground. The second triode 30 is cathode driven with its control electrode 31 maintained at a generally fixed value by the voltage divider 74, 75 connected across the regulated potential terminals 79, 59. This voltage divider forms, with resistor 45 and tubes 20, 85, a bridge circuit tending to balance out any potential change between control electrode 31 and cathode 29 which might be attributable to a voltage change at terminal 79.

Resistor 45 also performs the function of introducing sufficient anode current to triode 20 to obtain a substantial gain improvement without appreciable diversion of signal from the second triode 30. Connection of resistor 45 to the positive terminal 79 and hence indirectly rather than directly to the positive terminal 90 is observed not to alter its functioning within the principles of the invention.

On the other hand, connection of load resistors 35*a*, 35*b* between terminal 90 and control electrode 69 affords a regenerative path by which variations in the potential at terminal 90 would tend to produce like variations at terminal 79. In addition, the finite dynamic plate resistance of series valve 70 will tend to make terminal 79 rise and fall with power supply fluctuations. To minimize these tendencies, a feedback signal is applied to control electrode 31 by coupling the terminal 90 to the resistor 75 with the proper amplitude and phase. Such coupling, accomplished by capacitor 104 and resistor 103, tends to cancel the resistive effects of valve 70′, converting it into nearly an infinite dynamic impedance, at the same time canceling the development of potential variations at the control electrode 69 arising from connection of the load resistor 35*a*, 35*b* to the terminal 90.

From a comparison of Figs. 4 and 5, it will be apparent that adaptation to D.-C. amplification has been accomplished in part by removal of coupling capacitors 15, 37, 55 and 68. The bridge function of capacitors 37 and 67 may be assumed by cathode load resistors 75 and 74 when connected as in Fig. 5. At the same time, load resistor 75 affords relatively high impedance feedback coupling between positive terminal 90 and the control electrode 31 of the second triode.

Thus the advantages of the invention discussed above in connection with the preceding embodiment inhere in its application to D.-C. amplification, as taught in Fig. 5.

Where the expressions "direct connection," "directly connected" or "directly connecting" are used in the specification and claims, they denote a connection which provides a substantial D.-C. conducting path. Thus a small resistor might be interposed between the anode 22 and cathode 29 to provide cathode bias for the control electrode 31, for example. Such a connection would yet be "direct" in its ability to pass direct current.

While particular embodiments of the present invention have been shown and described, it is apparent that changes and modifications may be made without departing from this invention in its broader aspects, and therefore the aim in the appended claims is to cover all such changes and modifications as fall within the true scope and spirit of this invention.

I claim:

1. A wideband signal translating system comprising first and second electron discharge devices each having a cathode, an anode and a control electrode, the cathode of said second device being directly connected in series with the anode of said first device to be driven with respect to the control electrode of said second device, means including series-connected load and decoupling resistors for connecting the anode of said second device to a positive terminal of an anode curent source and the cathode of said first device to the negative terminal of said source to provide a series circuit for anode current through said devices, means for providing a D.-C. anode current path including an impedance for connecting the anode of said first device to the junction of said load and decoupling resistors, an input circuit including the control electrode and the cathode of said first device for applying a signal to said system, and an output circuit coupled to said load resistor for delivering signals from said system.

2. A wideband signal amplifying system comprising first and second electron discharge devices each having a cathode, an anode and a control electrode, the cathode of said second device being directly connected in series with the anode of said first device to be driven with respect to the control electrode of said second device, means including series-connected load and decoupling resistors for connecting the anode of said second device to a positive current terminal of an anode current source and the cathode of said first device to the negative terminal thereof to complete a series circuit for anode current through said devices, an impedance affording a relatively low resistance D.-C. conducting path connected directly to the anode of said first device and to the junction of said load and decoupling resistors for supplying anode current to said first device, an output circuit coupled to said load resistor, and an input circuit including the control electrode and the cathode of said first device for applying a signal to said system.

3. A wideband signal amplifying system comprising first and second electron discharge devices each having a cathode, an anode and a control electrode, the cathode of said second device being directly connected in series with the anode of said first device to be driven with respect to the control electrode of said second device, a positive and a negative terminal, series connected load and decoupling resistors connecting the anode of said second device to said positive terminal, means for connecting the cathode of said first device to said negative terminal to complete a series path for anode current through said devices, a resistor having a lower resistance than said load resistor connected directly to the anode of said first device and to the junction of said load and decoupling resistors, thereby to render optimum the gain of said system, an output circuit connected across said load resistor, and an input circuit including the control electrode and the cathode of said first device for applying a signal to said system.

4. A wideband signal translating system comprising first and second electron discharge devices each having a cathode, an anode and a control electrode, the cathode of said second device being directly connected to the anode of said first device, a positive and a negative terminal, series-connected load and decoupling resistors connected between said positive terminal and the anode of said second device, means for connecting the cathode of said first device to said negative terminal to complete a series circuit for anode current through said devices, a resistor of lower value than said load resistor connected to the anode of said first device and to the junction of said load and decoupling resistors, a grid-leak resistor connected between the control electrode and the cathode of said second device, means including capacitors connected between the control electrode of said second device and each of said terminals for substantially grounding the A.-C. potential of the control electrode of said second device, an input circuit including the control electrode and the cathode of said first device for applying a signal to said system, and an output circuit including said load resistor.

5. A wideband signal translating system comprising first and second electron discharge devices each having a cathode, an anode and a control electrode for triode operation, the cathode of said second device being directly connected to the anode of said first device, a positive terminal for an anode current supply, series-connected load and decoupling resistors connected between said positive terminal and the anode of said second device, a resistor of resistance approximately an order of magnitude smaller than said load resistor connected directly to the anode of said first device and connected to the junction of said load and decoupling resistors, a negative terminal for said anode current supply, means for connecting the cathode of said first device to said negative terminal substantially to fix the potential of said cathode and to complete an anode circuit in series through said devices, means for capacitively coupling the control electrode of said second device to at least one of said terminals substantially to fix the alternating potential thereof, an input circuit including the control electrode and the cathode of said first device for applying a signal to said system, and an output circuit including said load resistor.

6. A wideband signal translating system comprising first and second electron discharge devices each having a cathode, an anode and a control electrode, the cathode of said second device being directly connected to the anode of said first device, a positive terminal, a load resistor connected between said positive terminal and the anode of said second device, a current supply resistor connected between the anode of said first device and said positive terminal, a negative terminal connected with the cathode of said first device to complete a series anode current circuit with said devices, like capacitances connected between the control electrode of said second device and each of said terminals to form a bridge with said current supply resistor and said first device about the cathode and control electrode of said second device, an output circuit coupled with said load resistor, and an input circuit including the control electrode and the cathode of said first device for applying a signal to said system.

7. A wideband signal amplifying system comprising first, second and third electron discharge devices each having a cathode, an anode, and a control electrode, the cathode of said second device being directly connected to the anode of said first device, a positive power supply terminal, load resistors connected between said positive terminal and the anodes of said second and third devices, respectively, a current supply resistor connected between the anode of said first device and said positive terminal, a negative terminal connected with the cathode of said first device to complete a common anode current circuit, a capacitor connected between the control electrode of said second device and said negative terminal, a grid resistor connected between the control electrode and the cathode of said second device, means for coupling the anode of said second device to the control electrode of said third device, the cathode of said third device being connected to said negative terminal, an input circuit including the control electrode and the cathode of said first device for applying a signal to said system, and a capacitor connected between the control electrode of said second device and said positive terminal and proportioned relative to said aforementioned capacitor to balance the potential difference between the control electrode and the cathode of said second device with respect to undesired signals at said positive terminal.

8. A wideband signal translating system comprising first and second electron discharge devices each having a cathode, an anode and a control electrode, the cathode of said second device being directly connected to the anode of said first device, a positive terminal, a load resistor connected between the anode of said second device and said positive terminal, a resistor connected between the anode of said first device and said positive terminal to augment the supply of current to said first device, a negative terminal connected with the cathode of said first device for completing a series anode current circuit through said devices, a feedback resistor connected between said negative terminal and the control electrode of said second device, an input circuit including the control electrode and the cathode of said first device for applying a signal to said system, and output circuit means coupled to said load resistor and including output terminals between which said feedback resistor is connected for applying a feedback signal to the control electrode of said second device.

9. A wideband signal amplifying system comprising first and second electron discharge devices forming an amplifier input stage, each of said devices having a cathode, an anode and a control electrode, a third electron discharge device having a cathode, an anode and a control electrode forming an output stage, the cathode of said second device being directly connected to the anode of said first device, a positive terminal, a load resistor connecting the anode of said second device to said positive terminal, an impedance affording a D.-C. conducting path connected between the anode of said first device and said positive terminal, a grid resistor connected between the control electrode and the cathode of said second device, an input circuit including the control electrode and the cathode of said first device for applying a signal to said system, circuit means including said load resistor for coupling said second device with the control electrode of said third device, a negative terminal connected with the cathode of said first device to complete a series anode current circuit between said terminals, a by-pass capacitor and a feedback resistor in series, said capacitor being connected directly to the control electrode of said second device and said feedback resistor being connected to said negative terminal, the cathode of said third device being connected to the junction of said by-pass capacitor and said feedback resistor, and an output circuit coupled with the cathode of said third device and including said feedback resistor for deriving signals from said system.

10. A wideband signal amplifying system comprising first and second electron discharge devices forming an amplifier input stage, a third electron discharge device forming an output stage, each of said devices having a cathode, an anode and a control electrode, the cathode of said second device being directly connected to the anode of said first device, a positive terminal, a load resistor connecting the anode of said second device to said positive terminal, a resistor affording a D.-C. conducting path connected directly to the anode of said first device and to said positive terminal, a grid resistor connected between the control electrode and the cathode of said second device, an input circuit including the control electrode and the cathode of said first device for applying a signal to said system, circuit means including said load resistor for coupling said second device with the control electrode of said third device, a negative terminal connected with the cathode of said first device to complete first and second anode current circuits between said terminals, a by-pass capacitor and a feedback resistor in series, said capacitor being connected directly to the control electrode of said second device and said feedback resistor being connected to said negative terminal, a cathode load resistor connected to the junction of said by-pass capacitor and said feedback resistor and connected to the cathode of said third device, and an output circuit including said cathode load resistor and said feedback resistor for deriving signals from said system.

11. A signal translating system comprising first and second electron discharge devices each having a cathode, anode and control electrode, the cathode of said second device being directly connected to the anode of said first device, a positive and a negative terminal, a load resistor connected between the anode of said second device and said positive terminal, a current supply resistor connected between said positive terminal and the anode of said first device, means for connecting the cathode of said first device with said negative terminal to complete first and second anode current circuits between said terminals, means including a voltage regulating device connected between the control electrode of said second device and said terminals to stabilize the potential of such control electrode with respect to the potential of said terminals, an input circuit including a feedback resistor and the cathode and control electrode of said first device for applying a signal to said system, and an output circuit coupled between the anode of said second device and said negative terminal and including output terminals between which said feedback resistor is connected for deriving an output potential at said output terminals and applying a portion thereof to said input circuit.

12. A signal translating system comprising first, second and third electron discharge devices each having a cathode, anode and control electrode, the cathode of said second device being directly connected to the anode of said first device, a positive and a negative terminal, first and second resistors connecting the anode of said second device to said positive terminal, the anode of said third device being directly connected to said positive terminal, the control electrode of said third device being directly connected to the anode of said second device, a current supply resistor connecting the cathode of said third device with the anode of said first device, means for connecting the cathode of said first device with said negative terminal to complete anode current circuits between said terminals, resistors connecting the control electrode of said second device with said negative terminal and with the cathode of said third device, resistors connecting the control electrode of said first device with said negative terminal and with the cathode of said third device to apply an input signal between the cathode and control electrode of said first device, and an output circuit connected between said negative terminal and the cathode of said third device for deriving a regulated potential from said system.

13. A signal translating system comprising first, second and third electron discharge devices each including a cathode, anode and control electrode; a positive and a negative terminal; there being direct connections between the anode of said third device and said positive terminal, the control electrode of said third device and the anode of said second device, and the cathode of said second device and the anode of said first device; first and second resistors in series connected between said positive terminal and the anode of said second device and having their junction capacitively coupled to said negative terminal; a current supply resistor connected between the cathode of said third device and the anode of said first device; means for developing a reference biasing potential connected between the cathode of said first device and said negative terminal; a potential divider connecting the control electrode of said first device to said negative terminal and to the cathode of said third device to apply an input signal between the cathode and control electrode of said first device proportional to the output signal at said negative terminal and such cathode; resistors connecting the control electrode of said second device to said negative terminal and to the cathode of said third device; a resistor connected between said positive terminal and the control electrode of said second device to introduce a signal to compensate for any signal coupled from said positive terminal to the cathode of said third device; and means including a rectifier for connecting an unregulated A.-C. supply with said terminals to obtain a regulated D.-C. output between the cathode of said third device and said negative terminal.

14. A wideband signal translating system comprising first and second electron discharge devices each having a cathode, an anode and a control electrode, the cathode of said second device being directly connected to the anode of said first device, a positive terminal, load and decoupling resistors in series connected between the anode of said second device and said positive terminal, a resistor connected between the anode of said first device and the junction of said load and decoupling resistors to augment the supply of current to said first device, a negative terminal connected with the cathode of said first device for completing a series anode current circuit through said devices, an input circuit including the control electrode and the cathode of said first device for applying a signal to said system, output circuit means coupled to said load resistor and including output terminals and a feedback resistor connected therebetween, and means coupled with said feedback resistor for applying a feedback signal proportional to the output of said system to one of said devices to provide a closed degenerative feedback loop.

References Cited in the file of this patent

UNITED STATES PATENTS

| | | |
|---|---|---|
| 2,138,891 | Soller | Dec. 6, 1938 |
| 2,310,342 | Artzt | Feb. 9, 1943 |
| 2,474,435 | Moore | June 28, 1949 |
| 2,488,410 | Keizer | Nov. 15, 1949 |
| 2,489,266 | Cawein | Nov. 29, 1949 |
| 2,556,692 | Holdaway | June 12, 1951 |
| 2,605,430 | Marcy | July 29, 1952 |
| 2,673,254 | Eland | Mar. 23, 1954 |
| 2,747,028 | Clark | May 22, 1956 |

FOREIGN PATENTS

| | | |
|---|---|---|
| 415,079 | Great Britain | Aug. 16, 1934 |
| 703,946 | Great Britain | Feb. 10, 1954 |